INVENTOR.
CURT KRONSBEIN

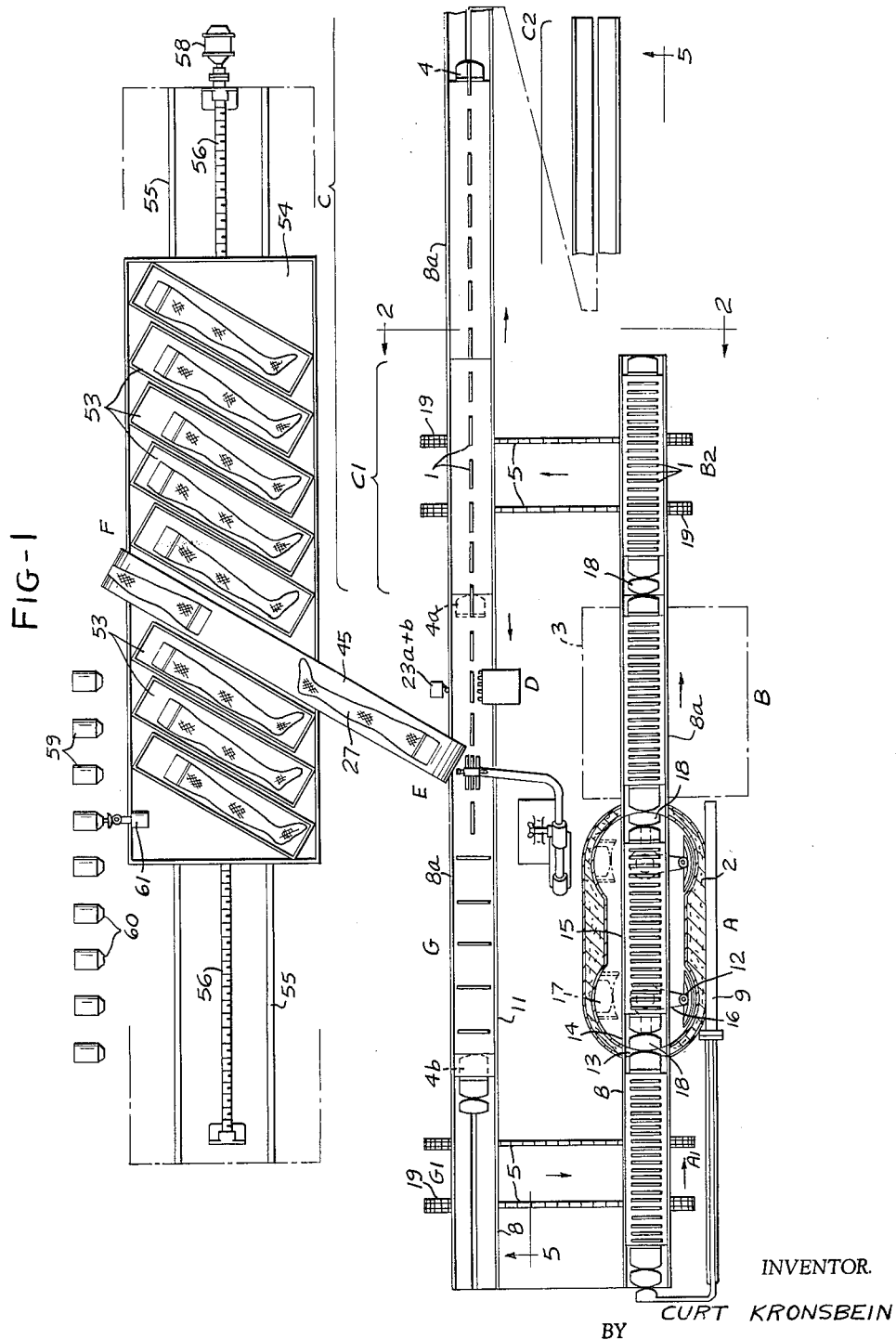

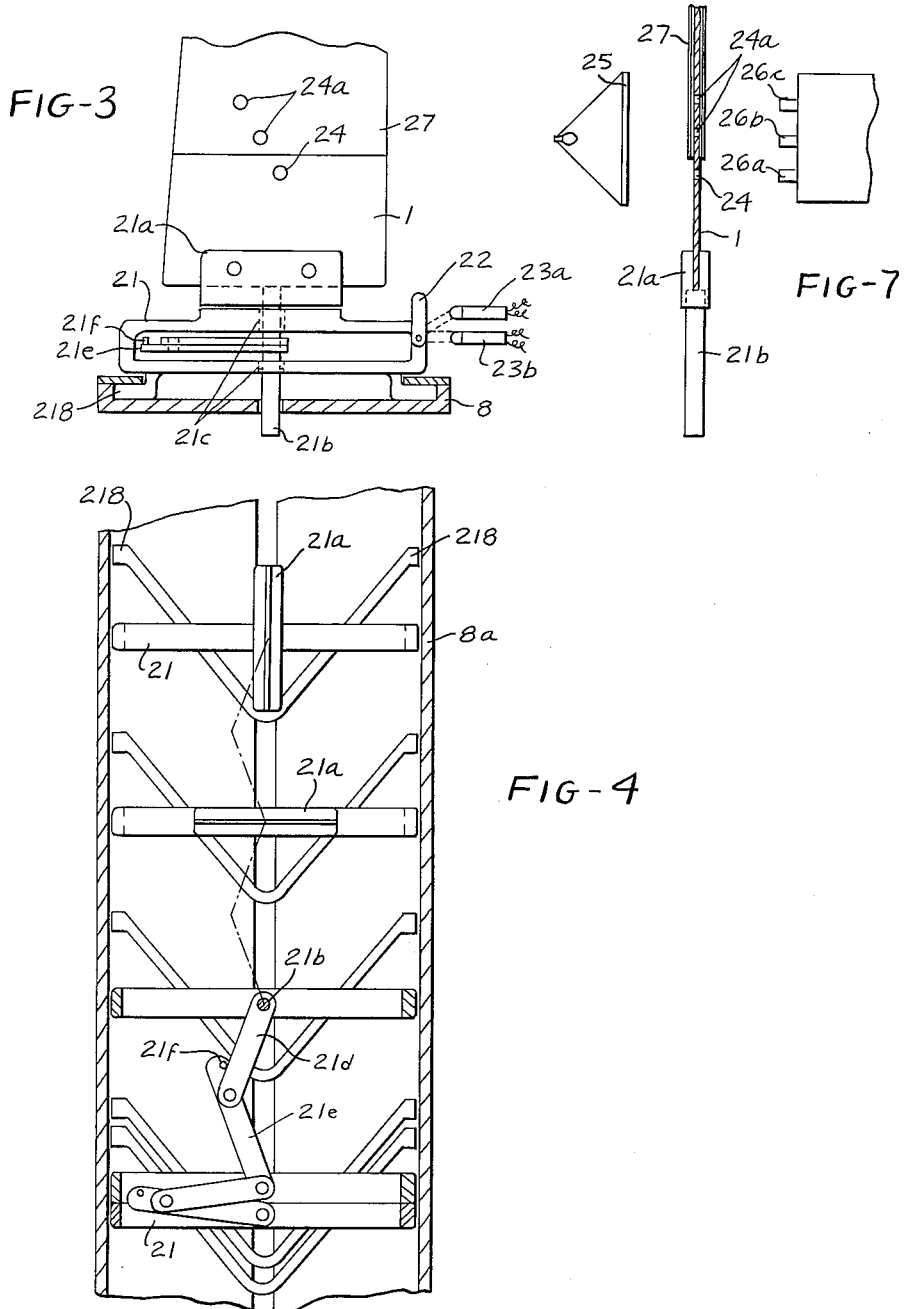

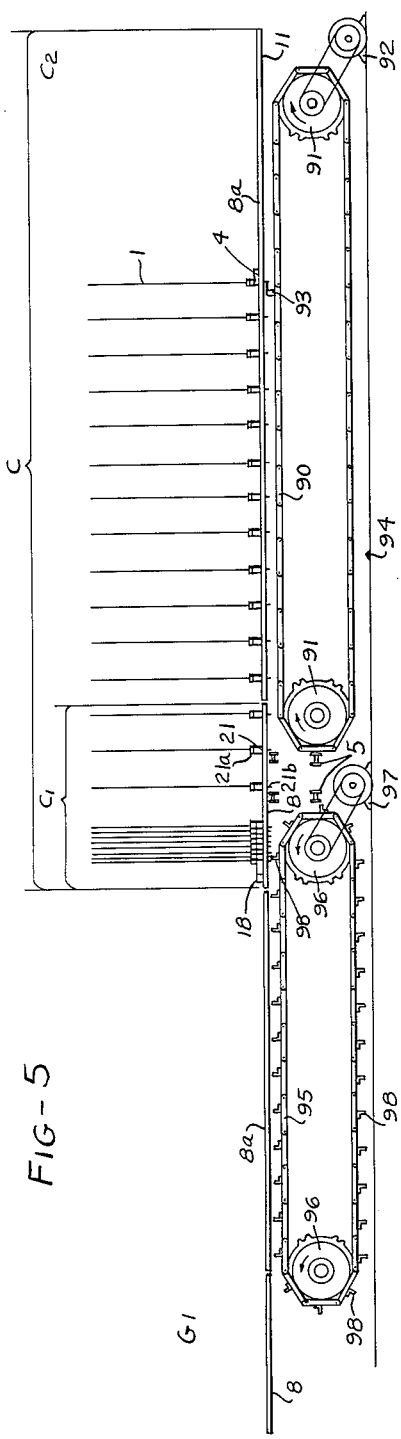

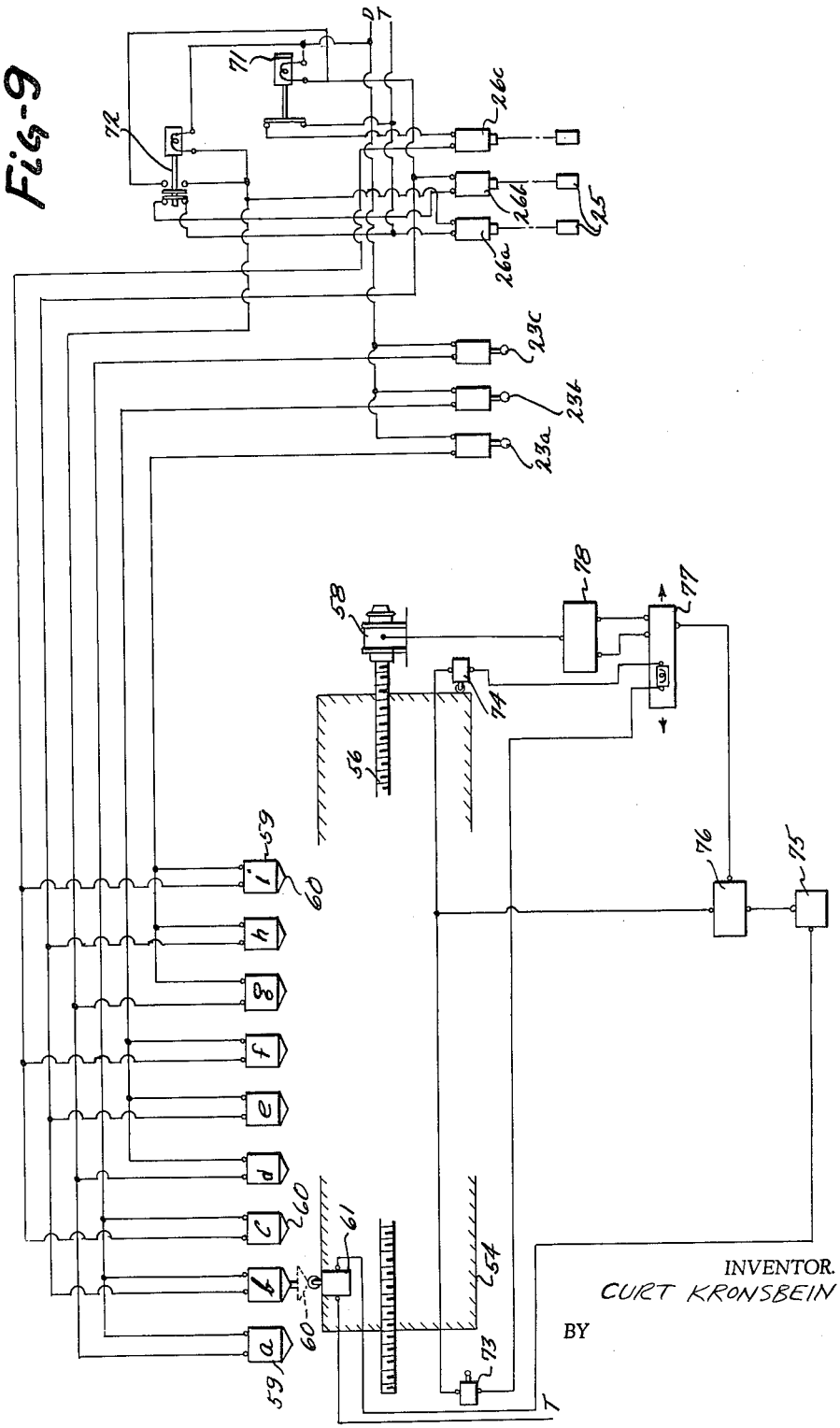

United States Patent Office 3,206,023
Patented Sept. 14, 1965

3,206,023
APPARATUS FOR USE IN CONNECTION WITH THE PROCESSING OF STOCKINGS, KNITTED GOODS AND THE LIKE
Curt Kronsbein, Hagen-Boelerheide, Germany, assignor to Elfriede Bellmann, nee Vogelsang, Ruth Kronsbein, nee Bellmann, and Friedhelm Bellmann, all of Hagen, Germany
Filed May 15, 1963, Ser. No. 280,662
Claims priority, application Germany Dec. 30, 1959
8 Claims. (Cl. 209—75)

The present invention relates to an apparatus for use in connection with the processing of stockings, knitted goods, and the like. This application is a continuation-in-part application of my co-pending patent application Ser. No. 77,915, filed December 23, 1960, and which is now abandoned.

In connection with the process of stockings, knitted goods, and the like, it has been customary for quite some time to automatically carry out the processing steps of washing, dyeing, fixing, dressing and drying. To this end, various methods and devices are known. The thus treated stockings had then by hand to be withdrawn from the various supports and had then after being inspected for quality to be manually sorted according to length and quality. To this end, the stockings were again placed upon a support, inspected as to quality, and subsequently were sorted as to length by placing them one upon the other.

It is, therefore, an object of the present invention to provide an improved arrangement for carrying out all necessary steps in the entire process from the raw stocking to the finished stocking, including those steps mentioned above which heretofore had to be carried out manually.

It is also an object of this invention to provide an apparatus for use in connection with the processing of stockings, knitted goods, and the like, in which the sorting according to length will be effected automatically.

It is a further object of this invention to provided an apparatus as set forth in the preceding paragraphs, in which the stockings are withdrawn from their respective supports automatically and are automatically conveyed to a sorting installation for sorting and depositing them according to quality and length.

These and other objects and advantages of the invention will appear more clearly from the following specification in connection with the accompanying drawings, in which:

FIGURE 1 illustrates, somewhat diagrammatically, a top view of an apparatus according to the present invention showing A—a pressure chamber for fixing, washing and dyeing,
B—a processing chamber for finishing and drying,
C—a station for controlling the quality,
D—a device for measuring the length,
E—a withdrawing station,
F—a depositing or sorting station according to quality and length, and
G—a station for mounting the raw stockings.

FIGURE 3 illustrates an individual stocking holder with a quality marking lever and is indicated by line 3—3 of FIGURE 1.

FIGURE 4 is a plan view showing a portion of a packet partly open and partly closed.

FIGURE 5 is a section on line 5—5 of FIGURE 1 showing a packet being opened up in station C.

FIGURE 6 is a view like FIGURE 5 showing the packet after the quality check has been made.

FIGURE 7 shows a photoelectric measuring device for measuring the length of the stockings.

FIGURE 9 shows the control circuit for the sorting station.

Figure 8:
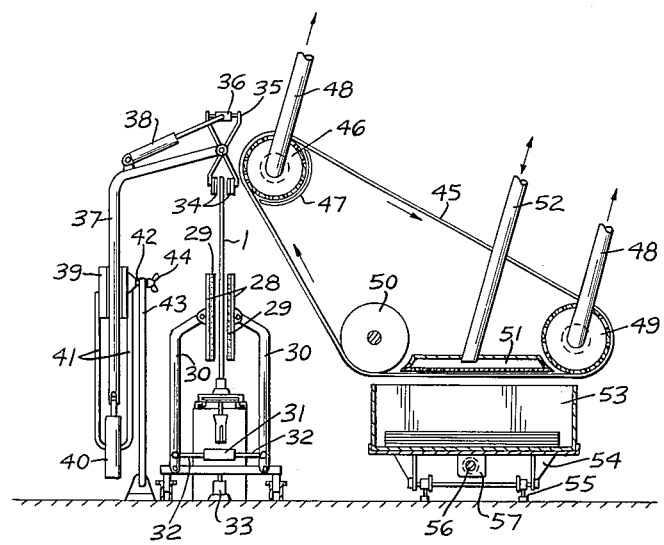
FIGURE 8 shows the stripping or withdrawing station at E.

The apparatus according to the present invention is primarily for processing stockings, knitted goods, and the like, according to which the stockings are mounted on flat supports and while thereon by means of a conveyor are passed through devices for fixing, washing, dyeing, finishing and drying. According to the present invention, the stockings, during further working steps, remain on the same supports until the stockings have been finished and sorted. In further conformity with the present invention, the stockings, mounted on the supports, are spaced on a conveyor expedient distances from each other and turned parallel to the longitudinal direction of the conveyor path for carrying out a quality control operation. Expediently, each individual stocking support is mounted on a holder and is rotatable thereon about a vertical axis.

According to a further development of the invention, the quality control station includes indicating means for the sorting of the stockings and may control a corresponding sorting device. In this connection, the length measuring station may release a signal or impulse for the sorting device or may control the latter directly. Furthermore, also the measuring of the length may, in conformity with the present invention be effected automatically, for instance photoelectrically, and the result of such measurement is, for purposes of indicating the measured result at the sorting device or, for purposes of automatically controlling the sorting device, brought into operative connection with the quality control.

Referring now to the drawings in detail, the various stocking supports or forms 1 are combined into packets and pass the various processing or treatment stations of the machine in the direction of the arrows in FIGURE 1.

The support or form packets may selectively be pushed together or pulled apart as will be explained hereinafter. The forms are connected by a collapsible scissor-like linkage and each form is rotatable on a vertical axis on a supporting base portion or holder. In FIGURE 3, the base portion is 21 and the form is fixed to a holder member 21a on shaft 21b that is rotatable in base 21. Base 21 has feet 21g slidably guided in a support plate which is longitudinally slotted to receive shafts 21b. The support plates 8 at stations A, G₁, B₂ and C₁, are laterally movable while support plates 8a in stations A and B, D, E and G, and C₂ are stationary.

FIGURE 1 illustrates a form packet loaded with raw stockings and occupying the station A₁. A second packet is at station A for washing and fixing and dyeing in pressure container 2. Still another packet is at station B which represents the finishing and drying station, while still another form packet is at station B₂ with completed stockings. As will be seen from the drawings, all of these forms or supports are parallel and close to each other in pushed together position. Still another form packet has been opened up in station C and is passing through station C for quality control, while the length measuring operation takes place at station D. The station E represents the station for withdrawing the stockings from the respective forms, and station G represents the station for mounting the stockings on the supports or forms. When passing through all of these stations, the forms of the form packet are in opened up or pulled apart condition to such an extent that the forms can be turned on their respective support shafts parallel to the direction of travel thereof and will be in a row in longitudinal direction one behind the other. This makes it possible that the stockings can be examined at station C from all sides as to quality. The treatment stations, C, D, E and G are passed through at a certain rhythm, which means that, after each movement an amount equal to the spacing of the forms, the packet stops so as to allow measuring of the length and the withdrawing or mounting of the stockings.

After the packet has passed all stations, the forms are pushed together again in station $G_1$.

With regard to the form holder and the packet which is made up of a plurality of form holders, reference may be made to FIGURES 3 and 4 in which it will be seen that each base portion 21 includes a stationary triangular lower part including the feet 21g which slide in the track portions of the support plates. The individual base portions 21 are interconnected by the links 21e and 21d, with link 21e carrying a pin 21f which assists in guiding the forms properly in their relative movement between closed and open positions. The aforementioned shafts 21b are supported on bearings 21c, which are indicated in FIGURE 3.

The individual forms are manually rotatable between a first position in which they extend at right angles to the direction of travel of the packets and a second position in which they are parallel to the direction of travel of the packets.

Figure 2:
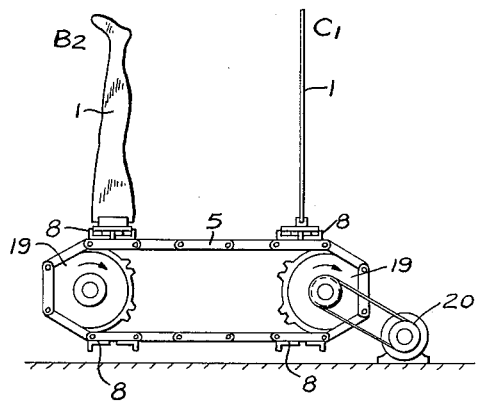
FIGURE 2 is a section on line 2—2 of FIGURE 1 showing a transverse transport for the support packets for the stockings.

With respect to the lateral transfer of the packets which takes place from station $G_1$ to $A_1$ and from station $B_1$ to $C_1$, this is accomplished by lateral movement of the support plate sections 8 laterally by the chains 5 to which these form sections are attached. This will be seen in FIGURE 2 which is a section indicated by line 2—2 on FIGURE 1. The chains 5 pass over sprockets 19 which are operated by motor 20. On these tracks are the support plate sections 8, which are movable laterally in accordance with the energization of drive motor 20.

As will be seen somewhat diagrammatically in FIGURE 1, the packet which is moved from station $B_1$ to station $C_1$ is then opened up and this is accomplished as is illustrated in FIGURE 5. In FIGURE 5 it will be seen that the shaft portion 21b of the foremost one of the form packets moved into station C is engaged by the clip 98 of a chain 95 that extends through stations D, E and G. The shaft 21b of the rearmost form of the packet moved into station $C_1$ is engaged by the clip 93 of a chain 90 disposed in station C. This last mentioned chain is supported on sprockets 91 driven by a motor 92 in the track indicated by the arrows in FIGURE 5. This chain operates to extend the packet into opened up position and the length of chain 90 is so selected that when the packet is fully opened, the clip 93 will separate from the shaft 21b engaged to be thus, leaving the packet in fully opened position. At this time the individual forms which are parallel with each other and at right angles to the direction of the length of the support plate 8a pertaining to station C.

Following the expansion of the packet into open position, the packet is moved by actuation of chain 95 which carries clips 98 so that the packet moves through stations D, E and G. Chain 95 passes over sprockets 96 which are actuated by motor 97. Inasmuch as the stockings or the like, which are mounted on forms which are to be inspected and the length thereof is to be checked, the forms are turned so as to be parallel to the direction of travel of the packet, as is illustrated in FIGURE 6. In this position the length measuring operation to be described hereinafter can be carried out, and inasmuch as the forms are freely rotatable on their respective supporting shafts, a quality control check can be readily made. Still further, the withdrawing station is so arranged that the forms are advantageously placed in a position parallel to the direction of travel of the packets. The withdrawing station is illustrated in FIGURE 8.

As will be seen from the foregoing, the packets are in collapsed position in station $A_1$ and are moved in this position into station A and remain in collapsed or closed up position while moved from station A to station B and from station B to station $B_2$. The form packets are then moved in collapsed position laterally from station $B_2$ to station $C_1$. The packets are then opened up in station C as above described, and in opened up position are advanced to stations D, E and G. In station G the forms are again turned manually into positions at right angles to the direction of movement of the form packet and the form packet is collapsed in station $G_1$ and in collapsed form is moved therefrom back to station $A_1$.

The movement of the form packets along the support plates 8 and 8a in station A, $A_1$, B and $B_2$ is accomplished by the pneumatic cylinder 9 and the piston and rod 10 pertaining thereto, the said rod 10 having means thereon engaging the end of the packet in $A_1$, namely, the end piece 18 of the said packet so that upon operation of the cylinder and piston arrangement, this packet is moved longitudinally together with the other packets arranged in the support plates.

A complete working cycle is carried out as follows: As soon as the rear end member 4 of the form packet passing through station E has advanced into the position 4a, a form packet moves from station B by means of two conveyor chains 5 to station $C_1$. These chains have mounted thereon sections 8 of the support plate in which the form packets slide, as will be seen in FIGURE 2, and when a packet form is moved from $B_2$ to $C_1$, a section of the support plate 8 also moves. In this station $C_1$, the form packet is grasped at the end piece and by means of conveyor chain 90 arranged below the path of the forms the end piece is moved to station $C_2$ while the forms of the packet are pulled apart to such an extent that a quality control will be possible at station C. By means of the conveyor chain 5, simultaneously with the form transport also a new empty section was brought to station $B_2$. At the same time, the treatment at stations A and B has been completed and the form packet at $A_1$ will, by means of a compressed air cylinder piston system 9 with connecting rod 10, be moved into the pressure container 2 of the treatment station A whereby simultaneously the form packets at A will be moved to station B and the form packets at B will be moved to station $B_2$. Thereupon, the processing at stations A and B will be initiated.

Approximately at the same time, the rear end member 4 of the form packet just loaded reaches its position 4b and is now in a collapsed position. At the same time, the transverse transport of the packet from station $G_1$ to station $A_1$ is started. This transverse transport has conveyor chains similar to the above mentioned conveyor chains 5 and has likewise support plates mounted thereon as will be seen in FIGURES 1 and 2. By means of the last mentioned working step, the situation shown in FIGURE 1 has been restored and a complete working cycle has been performed.

The transport of the form packet from station $C_1$ to station $G_1$ is effected by conveyor chain 95 which is arranged below the path of movement of the forms. The moving in and out of the form packet, and the pressure sealed closure of the processing container 2 is effected in the following manner:

In open position, as shown in FIGURE 1, the closure door 12 is arranged laterally of the door opening 13. The form path section arranged outside container 2 is connected to the form path section 15 by means of a small form path section 14, section 15 being fixedly mounted in the container 2. The inner body is rotatably journalled in container 2. The form path section 14 and the closure door 12 are connected to the inner body 16. If now the inner body 16 is rotated by approximately 90°, the part 14 moves away from the door opening 13 into the position 17, while simultaneously door 12 moves in front of door opening 13. The required distance between the form packets is determined by a spacer member 18. The remaining equipment of the treatment stations A and B is known per se so that a further description thereof does not appear to be necessary.

The transverse transport of the form packet from station $B_2$ to station $C_1$ and from station $G_1$ to station $A_1$ (see FIGURE 2) consists primarily of two chains 5, the sprocket wheels 19 pertaining thereto and a drive motor 20. Arranged on chain 5 and evenly spaced from each other are four form receiving support plates 8. Due to the transport of a form packet, an empty support plate immediately takes the place of the previously moved away support plate and thus can immediately again be loaded with a new form packet.

The quality control of the stockings is carried out at station C. The stockings normally sorted according to three qualities are, depending on their condition, marked by a marking on the stocking form base holder. FIGURE 3 shows a form holder base 21 with the lever 22 for marking the quality. Depending on the result of the inspection, the operator actuates control lever 22. If the lever 22 is moved upwardly, this will bring about the marking "first quality." If the lever is moved into its downward position, this will cause the lever to mark "third quality," and if the lever is moved into its intermediate position, this will cause the lever to mark "second quality."

The registration and transmission of the control impulse of the condition of quality is then effected at station G simultaneously with the measuring of the length. The moved form then passes by two switches 23a and 23b. Depending on the position of lever 22, either no switch (first quality) will be actuated, or switch 23a (second quality), or switch 23b (third quality) will be actuated. The measuring of the length may be effected in station D in various manners. Thus, for instance, as will be seen in FIGURE 7, the forms 1 may be provided at the level of the top or double thickness of the stocking with perforations 24. One side of the form is subjected to a uniform light 25 at the level of said perforations.

On the other side of said forms there are provided photoelectric cells designated 26a, 26b and 26c equalling in number the number of the perforations 24 (see FIGURE 4). Thus, the entire light passes through the open perforations 24 and initiates an electric impulse in photoelectric cells 26a, 26b or 26c, whereas the perforations 24a covered up by the end of the stocking 27 do not allow any light or only a limited quantity thereof to pass through for initiating an electric impulse. The number of the open and covered perforations 24 and 24a will represent a measurement of the length of the stocking.

It will easily be realized that also other methods may be employed for measuring the length of the stockings. Thus, instead of providing photoelectric cells, feeler pins may be employed which engage the open perforations whereas they are prevented from entering the covered-up perforations whereby corresponding control members are actuated in conformity with the measured length of the stockings.

When employing metallic forms or supports, advantage may be taken of the electric insulating effect of the stocking, and electrode pins may be employed. All electrode pins contacting the stocking material will not permit a flow of current whereas the other pins which contact the metallic form will close a circuit for electric impulses.

After two further operations, the stocking on the respective form will reach station E and will be withdrawn from the form. The withdrawing device which is illustrated in section in FIGURE 8 comprises two lower plates 28 arranged on both sides of form 1 and covered with covers 29 of an elastic material, as for instance foam rubber or sponge rubber. The two plates 28 which are adapted to grasp the stocking on form 1 approximately from the top or double thickness down to the calf portions are intended for displacing the stocking by a few centimeters in upward direction and thereby to loosen the stocking on the form. To this end, the plates 28 are pressed together by means of the levers 30 on which they are suspended so as to be able to move within certain limits and by means of the pneumatically operable cylinder piston 31 the two piston rods 32 of which are connected to the levers 30. The entire system is then moved upwardly by the pneumatic cylinder piston system 33. In the upper position, the two plates 28 open and then release the now loosened stocking.

The entire system is then lowered again into its starting position ready for the next working operation or working step. Immediately thereafter, the stocking is grasped by the two upper plates 34 which are likewise provided with an elastic cover similar to that for plates 28. The suspension of plates 34 is likewise adjustable and is suspended on a scissor-shaped lever system 35. The pneumatic cylinder piston system 36 brings about the grasping and releasing of the stocking by plates 34. The scissor-shaped levers 35 are suspended on a bar so as to be tiltable together with the cylinder 38 by approximately 90°.

The bar 37 is adapted to slide up and down in a guide 39. The stroke movement of bar 37 is likewise pneumatically effected by the cylinder piston drive 40 which is rigidly connected to guide 39 by means of struts 41. The guide 39 is by means of a threaded stud 42 tiltably journalled on frame 43 and is arrestable by means of an adjusting screw 44. In this way, the stroke movement during the withdrawal of the stocking is not effected vertically but at an inclined angle with regard to the direction of the tip of the foot of the form whereby the withdrawing of the stocking will be facilitated.

While the withdrawal operation will be evident from the above, it may be summarized as follows:

As soon as stocking form 1 carrying the stocking has moved between the open plates 28 and 34, the stocking is first moved upwardly by a few centimeters by means of plates 28 by actuating the pneumatic members 31 and 33. In this way, the stocking is loosened on the form. Thereupon, the stocking is grasped from the tip to the heel by means of the plates 34 when closing the scissor-shaped member 35 by means of the cylinder piston system 36. Immediately thereafter, the rod 37 is by means of the cylinder piston system 40 moved in upward direction and the stocking is withdrawn from the form. Approximately in or shortly after reaching the uppermost position of the rod 37, the scissor-shaped member 35 is by means of the cylinder piston system 38 tilted laterally outwardly whereby the stocking is placed upon the circulating band or belt 45. The scissor-shaped member 35 is opened by the cylinder piston system 36 and the withdrawn stocking is released.

Conveyor belt 45 then passes over a rotating drum 46 with circumferential perforations. The drum 46, the circumferential sector of which is not embraced by belt 45, is covered by a metal sheet 47 and through the intervention of a vacuum conduit 48 is subjected to a sub-atmospheric pressure so as to exert a suction effect on belt 45 as a result of which the tip of the stocking is retained while the further withdrawal of the stocking from form 1 is carried out. The conveyor belt 45 which may be guided in any convenient manner and the length of which may be selected according to the requirements, is according to the embodiment shown passed over two further drums 49 and 50 and back to drum 46, thus forming a closed ring. Drum 49, which is equipped similar to drum 46, produces a suction effect upon belt 45.

Between drums 49 and 50, belt 45 passes over a box 51 which is perforated toward the belt side. This box 51 is connected to a pipe line 52 which is connected to a source of vacuum in such a way as selectively to produce a suction effect on belt 45 or it may selectively be connected to a compressed air source for producing a repelling effect upon belt 45. Conduit 52 is arranged for selective connection to the suction side of a fan and to the pressure side of the said fan for selectively creating suction or pressure in box 51.

The withdrawn stocking will thus by means of belt 45 be transported from drum 46 to drum 49 and by means of the suction effect by which it is retained on the belt, to a station below the box 51, which, at this time, is under suction. As soon as the stocking in its entire length has reached the proper position over container 53, the suction in box 51 is interrupted and a pressure effect is produced therein and the stocking will be deposited in the sorting container away from the belt.

The sorting station F consists of a carriage 54 movable on rails 55. The control movement of this carriage is effected by means of a threaded spindle 56, nut 57 connected to carriage 54, and drive motor 58. The carriage 54 comprises a number of containers 53 corresponding to the number of the sorted articles. Thus, for instance for a quality assortment into three classes and an assortment for three lengths, there will be provided three times three equalling nine containers. The adjusting members 59 are actuated in conformity with the electric impulses emanated by stations C and D as measurements for the quality and length of the stockings. The respective adjustment pertaining to the ascertained quality actuates a conrol cam 60 so that the limit switch 61 mounted on carriage 54 is actuated and thereby motor 58 is turned off. The container 53 pertaining thereto will then be ready below belt 45 for receiving the sorted stockings.

FIGURE 9 shows schematically an electric circuit for the control of the sorting carriage 54 by quality and length of the stockings. There are three qualities and three lengths provided for so that there will be $3\times3=9$ sortings. These nine sortings correspond to nine different positions of the carriage. In FIGURE 9, 54 signifies the sorting carriage schematically, while 56 is the threaded spindle effecting its forward and backward movement and 58 the drive motor. At 61 is a limit switch on the carriage, 59 are nine adjusting member and 60 are the respective control cams. The adjusting member 59 which is effective operates the limit switch 61 on the carriage by means of control cam 60 and stops the motor so that the carriage is halted in the position corresponding to the respective adjusting member.

The choice of the sortings is effected by turning on one of the switches 23a, 23b, and 23c (that is, the condition represented by non-activation of switches 23a or 23b by lever 22 as an indication of first quality) as the stocking controlled belongs to a first, second or third quality. The connecting of the switches 23a, b and c with the circuit is effected by the respective chosen position of the lever 22 marking the qualities.

The sorting by the length takes place by operating the photoelectric switches 26a, 26b and 26c. In case of stockings of greatest length only the lowermost hole 24 of the stocking form remains uncovered so that merely switch 26a excited by the light source 25 is operated. By turning on switch 23a the three right adjusting members 59g; 59h; 59i are connected to one side of the supply circircuit. By turning on switch 26a the circuit is closed as shown in FIGURE 9 in such a way that only the adjusting member i is actuated. As in this position all the other adjusting members 59 are in ineffective position, including the one at b which engages switch 61, switch 61 closes the circuit so that the motor 58 begins to run. The carriage movement continues until switch 61 strikes against the cam of the adjusting member i and the motor is stopped again.

71 is a relay which turns off switch 26a as soon as switch 26b is turned on. Switch 26b is acutated when the central one of the holes 24 is cleared, which is the case of a stocking of medium length. The relay 72 turns off the two switches 26a and 26b in case of the shortest kind of stockings, that is when all the holes 24 are cleared and switch 26c is actuated.

In the control circuit for the carriage 54, 73 and 74 are the final position switches fixing the final positions of the carriage, and 75 is an on-switch; 76 a locking relay, 77 and 78 are the steering relays and the reversing contactor respectively for the direction of motion of the carriage. The carriage will run in one direction until it strikes one of switches 73 and 74 and will then reverse and run in the other direction until it strikes the other thereof and the position therebetween at which it halts is determined by the one of the adjusting members 59 which is actuated.

Power is supplied to the adjusting members 59 with a slight delay, 4 cycles, for instance. The delay corresponds to the time which passes from the positioning of the carriage up to the depositing of the stockings in the sorting carriage and which delay is needed for the automatic removing of the stockings.

The removing of the stockings takes place automatically as shown in FIGURE 8. For this purpose the air supplies to the cylinder pistons 31, 33, 38, 36 and 40 are conducted by a set of steering valves which are opened and closed respectively by a revolving camshaft in the necessary order to the time required. The device is arranged in such a way that during one rotation of the camshaft one removing operation is finished and the whole removing device is taken back to its starting position again.

As will be evident from the above, the great advantage of an arrangement according to the present invention will be evident when considering that the raw stocking following the processing thereof is discharged as fully completed stocking sorted as to quality and length and ready for packaging. The amount of labor and time and the possible impairment of the quality by manual contact is considerably reduced.

It is, of course, to be understood that the present invention is, by no means, limited to the particular constructions shown in the drawings but also comprises any modifications within the scope of the appended claims.

I claim:

1. In a processing machine for stockings, which comprises a plurality of stocking forms for receiving stockings to be processed and also comprises a plurality of stations, including a quality control station, a length measuring station and a withdrawing station for withdrawing the stockings from their respective forms, conveyor means adapted to receive said stocking forms to convey the same to all of said stations including said quality control station, said length measuring station and said withdrawing station, means for effecting said respective processing operation inherent to said stations including quality control and length measurement while said stockings remain on said forms, first gripper means associated with said withdrawing station for loosening said respective stocking at said withdrawing station from the form supporting same, and second gripper means associated with said withdrawing station for at least partially withdrawing the respective stocking from its form at said withdrawing station.

2. An arrangement according to claim 1, which includes a rotating conveyor adjacent said withdrawing station, and in which said second gripper means is tiltable for guiding a stocking being withdrawn from said form to said conveyor.

3. In a processing machine for stockings, which comprises a plurality of stations, including a length measuring station and a quality control station, for processing stockings and also including a withdrawing station for depositing the completed stocking: a plurality of stocking forms for receiving stockings to be processed, members for holding the forms and rotatably supporting the forms, first conveyor means adapted to receive said forms and members and to convey the same to all of said stations, including said quality control station, said length measuring station and said withdrawing station, means for effecting the respective processing operation inherent to said stations including quality control and length measurement while said stockings are on said forms, rotatable drums supporting a second conveyor means, said second conveyor means having a receiving end and a discharging end, and means respectively associated with said drums at said discharging end for respectively effecting a subatmospheric pressure and a pressure higher than atmospheric pressure for respectively retaining the received stockings and discharging the same.

4. In a processing machine for stockings, which includes a plurality of stocking forms for receiving stockings to be processed, and also comprises a plurality of stations including a quality control station and a length measuring station for processing stockings and also a withdrawing station for withdrawing completed stockings from their respective forms: holder members supporting said forms for rotation on their axes, first conveyor means adapted to receive said stocking forms and holder members and to convey the same to some of said stations except said quality control station, said length measuring station and said withdrawing station, second conveyor means adapted to receive said stocking forms and holders and to convey the same to said quality control station, said length measuring station and said withdrawing station, transverse conveyor means leading from opposite ends of said first conveyor means to said second conveyor means in a direction transverse to said first and second conveyor means adapted intermittently to convey groups of said stocking forms and holders from said first conveyor means to said second conveyor means and from said second conveyor means to said first conveyor means, and means for effecting the respective processing operation inherent to said stations including quality control and length measurement while said stockings remain on said forms.

5. A method of processing stockings through a plurality of work stations which comprises: placing the stockings on forms which are flat, supporting the forms upright, moving the forms in groups in one direction along a path with the forms extending at right angles to the path and closely grouped, separating the forms from each other and turning them so that they extend parallel to the direction of movement, moving the forms in the said spaced relation through quality control and length measuring stations, and stripping the processed stockings from the forms while the forms are parallel to the direction of movement thereof.

6. An arrangement according to claim 4, in which said first conveyor means includes means for automatically conveying therealong to the place from which the said group of stocking forms and their holder members were transported by said transverse conveyor means a group of empty forms and their holder members.

7. A method according to claim 5 in which unprocessed stockings are placed on said forms following the stripping of the processed stockings from the forms and while said forms remain parallel to the direction of movement thereof.

8. In a processing machine for stockings, which comprises: a plurality of stations including at least a first station wherein the stockings are subjected to a treatment by a fluid, a quality control station, a length measuring station, and a sorting station comprising a carriage with boxes corresponding in number to the number of kinds of stockings to be sorted, said carriage being movable in longitudinal direction corresponding to the respective occurring kind of stockings, a plurality of stocking forms for receiving stockings to be processed, a plurality of form vehicles, each of said vehicles being adapted to receive a plurality of said forms and to support the same in substantial parallel arrangement to each other selectively in a first condition in which said forms are pushed close together and lie in planes extending at right angles to the direction of movement of the vehicles, and in a second condition in which said forms are somewhat pulled apart from each other and lie in a plane parallel to the direction of movement of the vehicles, conveyor means adapted to receive said vehicles and to convey the same to said first station in said first condition and to said quality control station and said length measuring station and said sorting station in said second condition, means for effecting the respective processing operation inherent to said stations including said treatment by a fluid, said quality control, and said length measurement and said sorting, and means pertaining to said quality control station operation for conveying an indication corresponding to the quality of the respective stockings to said sorting station.

References Cited by the Examiner

UNITED STATES PATENTS

| | | | |
|---|---|---|---|
| 2,243,997 | 6/41 | Berger | 223—76 X |
| 2,794,340 | 6/57 | Cobert | 73—159 |
| 2,853,188 | 9/58 | Milliken | 209—73 X |
| 3,084,797 | 4/63 | Niles | 209—111.5 X |

ROBERT B. REEVES, *Acting Primary Examiner.*

SAMUEL F. COLEMAN, *Examiner.*